United States Patent
Blank et al.

(10) Patent No.: US 6,960,062 B2
(45) Date of Patent: Nov. 1, 2005

(54) FROST-RESISTANT WINDMILL FOR USE IN URBAN ENVIRONMENT

(76) Inventors: Anatoly Blank, 2728 E. 23rd St., Brooklyn, NY (US) 11235; Emil Blank, 2728 E. 23rd St., Brooklyn, NY (US) 11235; Leonid Blank, 2728 E. 23rd St., Brooklyn, NY (US) 11235

(*) Notice: Subject to any disclaimer, the term of this patent is extended or adjusted under 35 U.S.C. 154(b) by 60 days.

(21) Appl. No.: 10/342,474

(22) Filed: Jan. 16, 2003

(65) Prior Publication Data

US 2004/0141843 A1 Jul. 22, 2004

(51) Int. Cl.⁷ .............................................. F03D 3/00
(52) U.S. Cl. ................... 415/175; 415/907; 416/DIG. 6
(58) Field of Search ................... 290/54, 55; 415/4.2, 415/30, 83, 84, 86, 115, 144, 175, 176, 177, 180, 907; 416/231 R, 231 B, DIG. 4, DIG. 6

(56) References Cited

U.S. PATENT DOCUMENTS 5,302,084 A * 4/1994 Nelson ..................... 415/4.2

* cited by examiner

Primary Examiner—Edward K. Look
Assistant Examiner—Richard A Edgar
(74) Attorney, Agent, or Firm—Boris Leschinsky

(57) ABSTRACT

A frost-resistant windmill is disclosed to provide supplemental power supply for use preferably in large cities. The frame of the windmill carrying a plurality of blades is made hollow defining a serpentine internal air pathway adapted for introduction of warm air from an external source to prevent freezing when used during winter months. A centrifugal speed adjustment system is provided to reduce rotation speed fluctuations of the load drive shaft when strong wind gusts are encountered. A speed adjustment weight is connected to the drive wheel through a cable such that the position of the drive wheel along the radius of the windmill is defined by an equilibrium between the pull force on the cable and the compression force of the spring urging the drive wheel towards the periphery the windmill.

5 Claims, 4 Drawing Sheets

FROST-RESISTANT WINDMILL FOR USE IN URBAN ENVIRONMENT

BACKGROUND OF THE INVENTION

The present invention relates generally to windmill energy generators. More particularly, the device of the invention utilizes a centrifugal speed adjustment means to stabilize the speed of rotation of the windmill in conditions of various strength winds. Further, the windmill of the invention utilizes a heating system to prevent malfunctions of the device when operating in freezing temperatures. The windmill of the invention can be most advantageously used in urban environment.

It is well established that modern cities can benefit from renewable source power supplies. In addition, fluctuating demands for electrical power make it necessary to provide supplementary or secondary power supplies to the main electrical power grid of large cities. Preferably, such secondary power supply sources should be located close to large power consumers. They should be connected to the existing power grids to provide additional energy as required. Windmills have long been looked at as a good candidate for such secondary power supplies. However, due to many drawbacks of the known devices, they did not gain widespread acceptance in large cities, despite their commercial success in rural environment.

To be acceptable for use in large urban centers, such windmill power supply has to satisfy a number of requirements:

Be esthetically pleasing in the urban environment, have acceptable appearance that fits urban architecture;

Should provide year-round reliable and highly efficient operation, meaning it should work in both hot summer and freezing winter conditions;

Should be equipped with a speed adjustment means to smooth out fluctuations of the rotation of the power generating means from wind gusts.

No known design of a windmill power generator can satisfy the conditions above. The need therefore exists for such a design, which can be used in large cities and provide much needed supplemental power supply while becoming a natural part of the urban architecture.

SUMMARY OF THE INVENTION

Accordingly, it is an object of the present invention to overcome these and other drawbacks of the prior art by providing a novel constant speed frost-resistant windmill adapted for use in large cities.

It is another object of the present invention to provide a windmill equipped with a heating system to prevent malfunction in sub-freezing temperatures.

It is a further object of the present invention to provide a windmill with speed adjustment means adapted to smooth out fluctuations in the speed of rotation caused by sudden gusts of wind.

It is yet a further object of the present invention to provide a windmill with increased efficiency of power generation by providing windmill blades having a bottom cutout slit and a wind diverter to direct the wind upwards and create low pressure conditions on the blade backside.

The windmill of the invention encompasses a vertical shaft with windmill wings extending horizontally therefrom. Each wing is equipped with a partially hollow rectangular blade supporting frame adapted to carry a stream of warm air therein in a serpentine configuration to prevent all movable elements thereof from freezing in winter conditions. Each wing consists of two vanes located opposite each other and attached to the main shaft. Each vane supports a number of blades thereon supported by the rectangular frame. Each blade is attached to the vertical element of the supporting frame of each vane with the ability to turn about ¼ turn away from the wind in passive position and back into being perpendicular to the wind when in its operating position. The blades of one vane are attached as a mirror image of each other to allow rotation in a direction opposite to that of the opposite vane. That way, only one vane is active at one time regardless the direction of the wind. The shaft also carries a horizontal flywheel, which in turn rotates the drive wheels of the electrical generator or another useful load. A centrifugal speed adjustment means are also provided to slow down the rotation of the drive wheels in case of a sudden gust of wind by bringing the drive wheel closer to the center of rotation. The speed adjustment means include a system of pulleys connecting the spring-biased drive wheels to the speed governor weight in the upper portion of the supporting frame. The speed governor weight applies a centrifugal force to the pulleys and therefore to the drive wheel and counteracts the force of the spring to bring the drive wheel to the proper radius from the center of rotation.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE PREFERRED EMBODIMENT OF THE INVENTION

A detailed description of the present invention follows with reference to accompanying drawings in which like elements are indicated by like reference letters and numerals.

Figure 1:
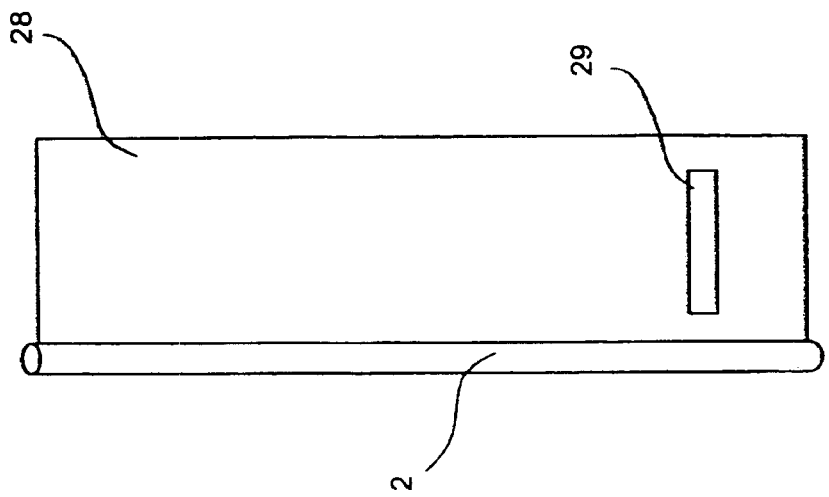
FIG. 1 is a general schematic outline of the windmill of the invention, shown in a configuration adapted for rotation counterclockwise.
Figure 2:
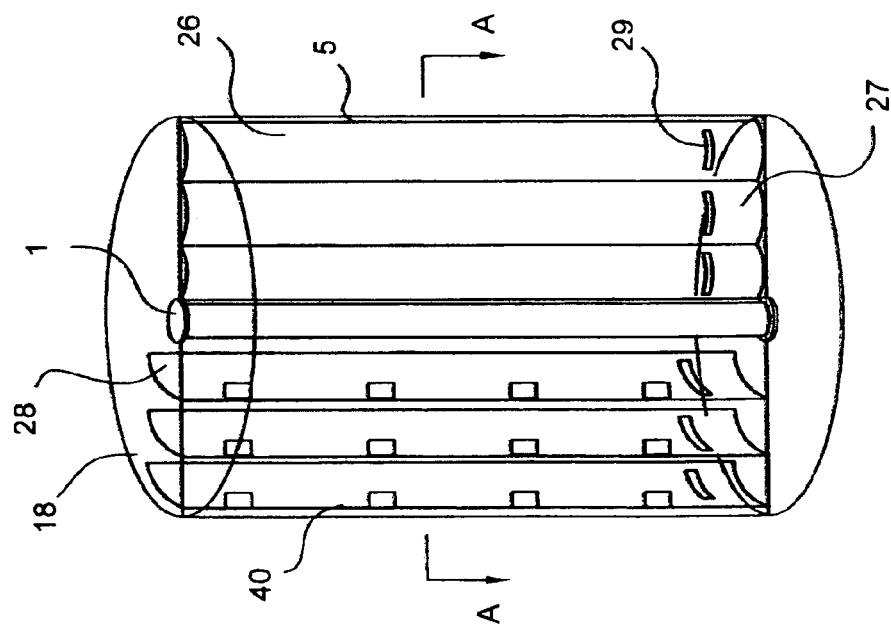
FIG. 2 is a view of a single blade of the windmill shown in FIG. 1.
Figure 3:
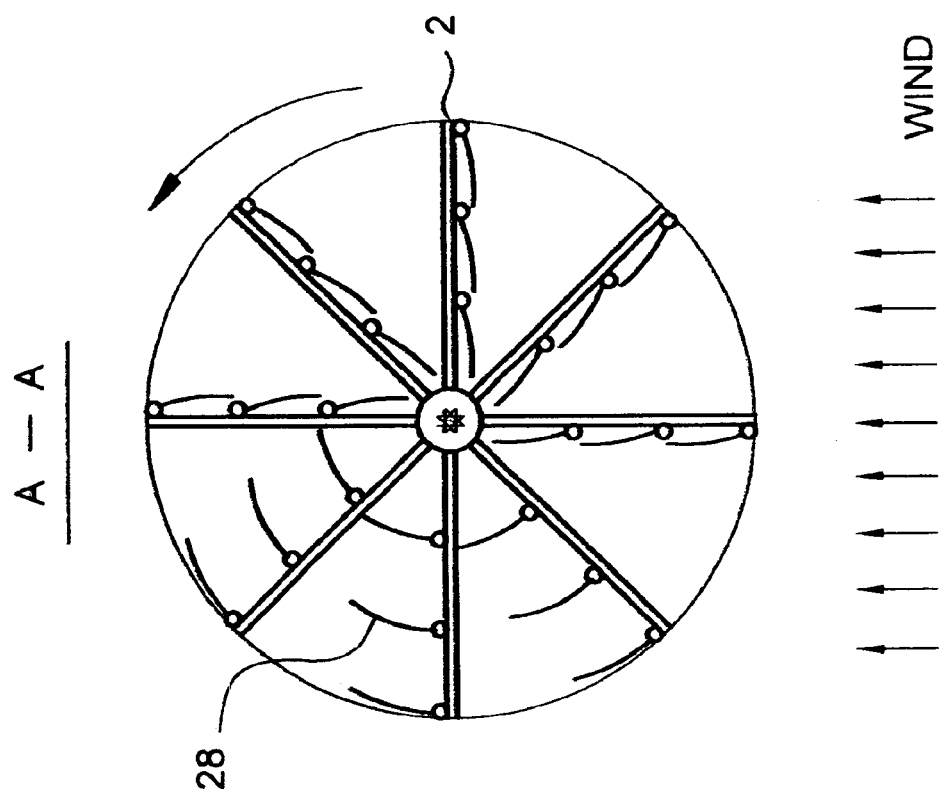
FIG. 3 is a top cross-sectional schematic view of the windmill along the lines A—A on FIG. 1 illustrating a principle of passive blade position of one side of the shaft and active blade position on the other to cause rotation of the windmill in a predetermined direction.
Figure 4:
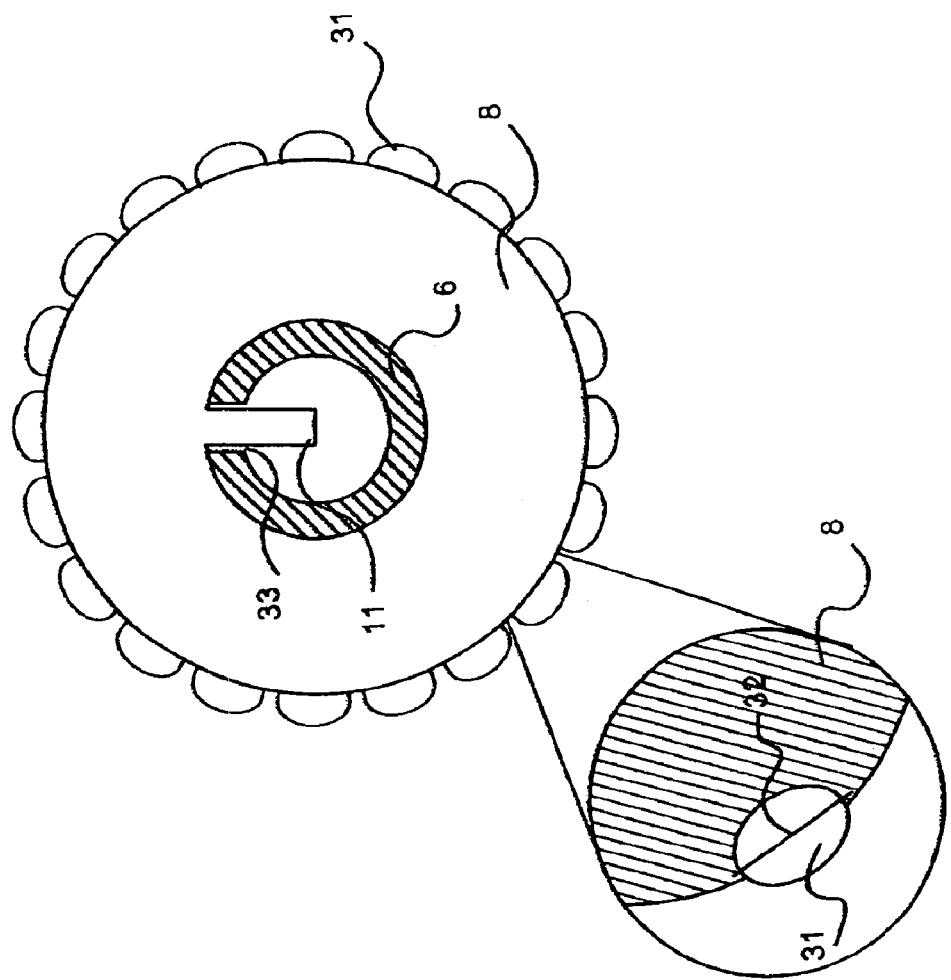
FIG. 4 is a schematic outline of the drive wheel of the invention.

FIGS. 1 through 5 illustrate the design of the windmill. FIG. 1 shows main hollow vertical shaft 1 carrying a number of wings 26. The main shaft 1 is supported between the lower base plate 25 and the upper base plate 18 connected to each other by a number of peripheral posts 5. Each wing 26 consists of two vanes 27 on both sides of the shaft 1. Each vane 27 includes a supporting frame 40 with one or more vertical peripheral posts 5, each post supporting a vertical blade 28. Free end of each blade 28 covers the adjacent peripheral post 5 so that these blades are arranged to overhang each other, similar to that of fish scales.

The frame 40 is made of alternating intermittent hollow and solid elements such as hollow and sealed pipes to create an internal serpentine air pathway for introducing of warm air. More specifically, the frame 40 includes a number of hollow vertical sections 2 equipped with hinges to hingedly support blades 28 and connected via hollow T-connectors 21 with a number of sealed pipes 4 alternating with hollow pipes 3. As a result, a serpentine pathway is created from the entrance 41 on the bottom of each frame at the point of its connection to the internal hollow portion of the shaft 1 all the way throughout the entire geometry of the frame 40 ending in an opening 42 on the top peripheral corner of the frame. Defrosting means are envisioned to introduce warm air through the pipe 19 into the inside of the shaft 1, will therefore circulate this warm air throughout each frame 40 to warm it up during the winter months and prevent ice forming and malfunction of the device. An outside fan and a heater can be used as such defrosting means to provide warm air to the pipe 19 (not shown on the drawings). An optional offshoot section 15 of the pipe 19 introduces warm air to other parts of the device as described later.

Each blade 28 is supported in the frame 40 in such a way that it can freely swing between one of two operating positions depending on the direction of wind:

an active position along the frame and perpendicular to the wind as shown on the right part of FIG. 1, and a passive position away from the frame and parallel to the wind as shown on the left part of that drawing.

Since the blades of one vane are attached to the frame of that vane on the side opposite that of the opposite vane, a wind blowing from any direction would cause one half of the blades on one vane to swing in their active position while the other half of the blades on the opposite vane would swing in their respective passive position. That in turn leads to a substantial difference in the cross-sectional area exposed to the wind between one vane and another vane. As a result, the entire wing will turn driven by the vane with blades located in the active position. That arrangement is further illustrated on FIG. 3.

A further design improvement described herein is an attempt to create the low-pressure conditions on the side of the blade not exposed to the wind. Each blade 28 contains a slit cutout 29 along its lower part (see FIG. 2) and a wind diverter is formed therein to direct the flow of air passing thought the slit 29 in the upward direction along the side of the blade not exposed to the wind. This flow of air decreases the pressure in the vicinity of that side of the blade with an airlift effect close to that of the airplane wings. As a result, there is an increase in the overall pressure differential between the side of the blade exposed to the wind and the opposite side exposed to the upward airflow. This further increases the efficiency of the energy generation by the device of the present invention.

The general design of the windmill shown in FIG. 1 can be utilized to drive any number of useful loads, such as an electrical power generator, an air compressor, and air turbine, or some other device pumping air into a air accumulator, etc. However, to make it even more useful, provisions are made to reduce the spikes in rotation caused by wind gusts as will now be described in more detail.

Specifically, the windmill of the invention is equipped with a centrifugal speed adjustment means taking advantage of the increasing levels of centrifugal forces when the rotation of the shaft 1 is intensified.

The most preferred configuration of the windmill of the present invention consists of all the previously described elements arranged such that the hollow main shaft 1 is adapted to turn a flywheel 20 located below the wings 26. The shaft 1 is rotatably supported between the lower base 25 and the upper base 18 in respective and upper bearing 23 and lower bearing 23'. The lower thrust bearing of the shaft is mounted in the lower casing 30 such that the shaft 1 is located above the casing 30.

Importantly, the flywheel 20 is attached to the shaft 1 via a joint having a series of vertical teeth and grooves 24 so that is can move vertically up and down to some limited degree along the main shaft 1 but still be engaged therewith and accept rotation forces therefrom. As a result of that, the flywheel 20 is suspended vertically and is supported only by a number of drive wheels 8 as will be described in more detail below. The entire weight of the flywheel 20 rests therefore on the drive wheels 8.

Figure 5:
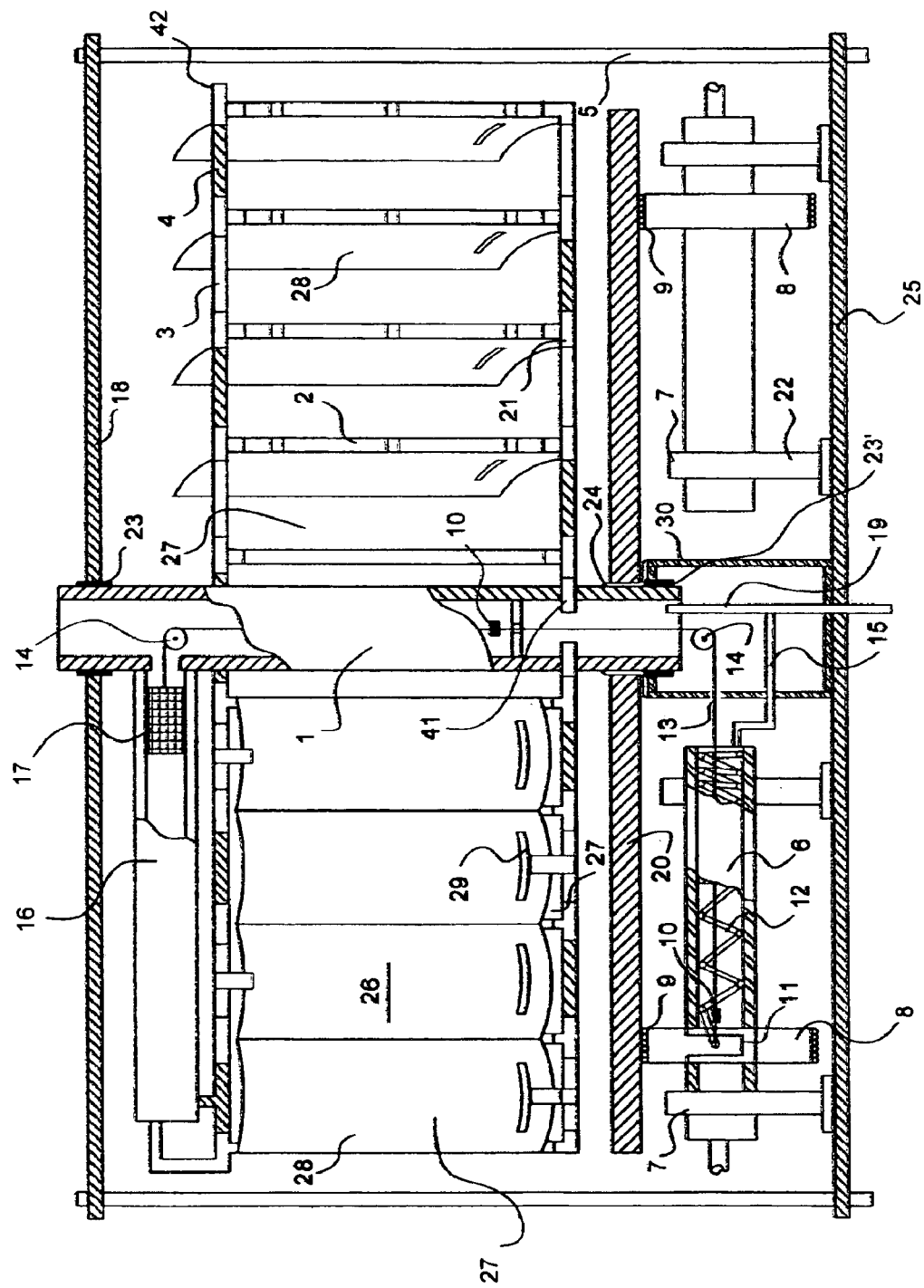
FIG. 5 is a cross-sectional view of the entire device, shown in a configuration adapted for clockwise rotation.

A series of radially directed hollow load drive horizontal shafts 6 are rotatably supported between their respective stands 22. Although FIG. 5 shows one such load drive shaft, those skilled in the art will appreciate that the device of the invention can utilize more than one such shaft. Each load drive shaft 6 is equipped with an active drive wheel 8 attached thereto. Importantly, each active drive wheel 8 can slide along the entire length of the horizontal load drive shaft 6 by having its key 11 sliding inside the groove 33 of the shaft 6, see FIG. 4. The key 11 protrudes to the inside of the shaft 6 and has an opening adapted to be connected to a cable 13, made of wire or rope. Therefore, pulling on the cable 13 would cause the drive wheel 8 to move closer to the center of rotation of the entire mechanism.

Each load drive shaft 6 is also equipped with a return spring 12 shown inside thereof, although other locations of the spring are also contemplated by this disclosure. Alternately, weights can be used with pulleys to perform the same function as described below. Each spring is designed to counteract the pull from the cable 13 and move the drive wheel 8 back towards the periphery of the device. When no pull is present from the cable 13, the design is adapted to place the drive wheel 8 in the most radially extended position all the way out towards the outer edges of the flywheel 20.

The drive wheel 8 is rotated by the flywheel 20 with a frictional contact therebetween. To reduce the drag force on the drive wheel 8 when it is moved along the flywheel 20 in and out of its center by the cable 13, each drive wheel 8 is equipped with a contact layer 9 comprising a number of small diameter rollers or beads 31. These rollers are preferably oriented in such a way that their axis of rotation 32 is parallel to the plane of the flywheel and perpendicular to its radius. The rollers serve as a bearing for the movement of the drive wheel 8 in and out of the center of rotation of the windmill. At the same time, the rollers 31 are design not to interfere with the frictional transmission of torque from the flywheel 20 to the drive wheel 8 and further to the horizontal shaft 6. The load drive shaft 6 can be further connected to anyone of the useful loads as described above.

The cable 13 connects the key 11 of the drive wheel 8 via a series of pulleys 14 to the inside of the main shaft 1 and then to the upper portion of the speed adjustment means. These means further comprise an upper hollow pipe 16 containing a speed adjustment weight 17 slidingly disposed therein. The weight 17 is chosen such that when centrifugal force is pushing it towards the periphery of the device, the pulling force on the cable 13 is counteracted by the force of the compressed spring 12 to bring the drive wheel 8 in the proper radial position.

Because of the fact that the main shaft 1 is continuously rotating during the operation of the device, a cable joint 10 is inserted along the length of the cable 13 inside the shaft 1 to ensure the ability of its upper part to rotate about its lower part. An additional cable joint 10 is inserted by the key 11. The design of such cable joint is commonly known and may include a conventional ball or dick joint.

If only one horizontal load drive shaft 6 is used to draw energy from the windmill of the invention, it is necessary to provide at least one other passive non load driving horizontal shaft with a permanently fixed freely rotating passive drive wheel to support the flywheel 20 of the device in balance. Providing two such shafts is preferred and separating all three shafts equally at 120 degrees apart is the most preferred arrangement as shown on FIG. 5. When two or more horizontal shafts 6 are used to drive some useful loads, each drive shaft is preferably equipped with its own speed adjustment means.

In use, the windmill of the invention is connected to the power grid through an optional control unit allowing it to contribute electrical power thereto only when available voltage has been detected to drop below a predetermined level. The windmill is preferably designed for use in urban environment. It should be preferably positioned to be exposed to the maximum intensity of winds available in the local area, such as on a roof of a building. Upon the presence of the wind, the blades of one vane assume their passive position and the blades of the other vane assume their active position. Rotation of the shaft 1 initiates the movement of the flywheel 20, which in turn starts the rotation of the drive wheel 8 positioned at first all the way out at the periphery of the load drive shaft 8. Assuming a reasonably constant wind speed, the flywheel 20 transmits the torque evenly to the drive wheel 8 and further causing rotation of the load drive shaft 6.

When the gust of wind is encountered, the speed of rotation of the main shaft 1 is temporarily increased, causing centrifugal forces to overcome the spring compression force from the spring 12. In turn, the weight 17 is moved away from the center of rotation towards the periphery of the device. That causes a pull force to develop on the cable 13, which is transmitted through the hollow shaft 1 and the pulleys 14 to the drive wheel 8 causing it to move while rotating towards the center of rotation of the device. The pull force is counteracted by compression of the spring 12 such that the drive wheel 8 is moved to some medium equilibrium point as determined by a balance between the action of the spring 12 and the centrifugal force action of the weight 17. In that medium position, the drive wheel 8 is exposed to the spinning motion of the flywheel 20 at a lower radius so that its speed of rotation is reduced and maintained reasonably close to the speed before the wind gust. The speed of rotation of the drive wheel 8 is maintained relatively constant despite the increased speed of rotation of the flywheel 20. Once the wind gust subsides, the mechanism moves the drive wheel 8 back to its desirable position on the periphery of the flywheel 20. Therefore, even in the conditions of sudden wind gusts, the windmill of the present invention provides a stable operation of the useful load by diminishing the speed fluctuations of the drive wheel 8.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A frost-resistant windmill comprising:
   a main shaft rotatably supported in a vertical position between a lower base plate and an upper base plate,
   at least one wing comprising a first vane and a second vane symmetrically extending from said main shaft, said first and said second vanes in turn including each a supporting frame with at least one blade hingedly attached thereto, each of said blades being supported in said frames to freely swing between an active position along said frame and a passive position away from said frame, said blade of the first vane is positioned as a mirror image of said blade of the second vane, said frames further comprising intermittent hollow and solid elements forming an internal air pathway, and
   a defrosting means adapted to introduce warm air into said internal air pathway to prevent said windmill from freezing.

2. The windmill as in claim 1, wherein said intermittent hollow elements of said frames comprising a first plurality of vertical hollow pipes and a second plurality of horizontal hollow pipes alternating with said solid elements comprising horizontal sealed pipes to define a serpentine shape of said internal air pathway.

3. The windmill as in claim 1, wherein said main shaft is hollow defining its internal portion, said internal air pathway of each frame is fluidly connected to said internal portion of said main shaft, said defrosting means adapted to introduce said warm air to said internal portion of said main shaft.

4. The windmill as in claim 1, wherein said blade defines a first side exposed to incoming wind and a second side not exposed to said wind, said blade further contains a horizontal slit cutout near its lower part with a wind deflector formed therein to direct the wind passing through said slit upwards along said second side of said blade.

5. A windmill comprising:
   a main shaft rotatably supported in a vertical position between a lower base plate and an upper base plate,
   at least one wing comprising a first vane and a second vane symmetrically extending from said main shaft, said first and said second vanes in turn including each a supporting frame with at least one blade hingedly attached thereto, each of said blades being supported in said frames to freely swing between an active position along said frame and a passive position away from said frame, said blade of the first vane is positioned as a mirror image of said blade of the second vane, said frames further comprising intermittent hollow and solid elements forming an internal air pathway,
   a defrosting means adapted to introduce warm air into said internal air pathway to prevent said windmill from freezing,
   a flywheel attached via a joint to said main shaft next to said lower base plate, said joint having a plurality of vertical grooves and teeth to allow said flywheel to move vertically up and down along said main shaft while still engaged therewith, said flywheel defining a lower side thereof, and
   at least one horizontal drive shaft rotatably supported on said lower base plate and oriented radially from a center of said base plate towards its periphery, said load drive shaft containing an active drive wheel engaged therewith in its center, said active drive wheel having an outer surface engaged with said lower side of said flywheel to transmit rotation from said flywheel to said load drive shaft and to vertically support said flywheel.

* * * * *